United States Patent [19]

Geczy

[11] Patent Number: 4,710,036
[45] Date of Patent: Dec. 1, 1987

[54] BEARING ASSEMBLY

[75] Inventor: Bela Geczy, Orange, Calif.

[73] Assignee: Smith International, Inc., Newport Beach, Calif.

[21] Appl. No.: 841,570

[22] Filed: Mar. 20, 1986

[51] Int. Cl.$^4$ ............................................. F16C 17/10
[52] U.S. Cl. ..................................... 384/275; 384/255; 384/285; 384/427; 384/907.1
[58] Field of Search ................. 384/275, 95, 285, 255, 384/280, 425, 427, 907.1

[56] References Cited

U.S. PATENT DOCUMENTS

| | | | |
|---|---|---|---|
| 2,331,584 | 10/1943 | Underwood | 29/149.5 |
| 2,581,252 | 1/1952 | Goetzel et al. | 75/22 |
| 3,127,224 | 3/1964 | Owens et al. | |
| 3,456,746 | 7/1969 | Garrison et al. | 175/320 |
| 3,879,094 | 4/1975 | Tschirky et al. | |
| 4,017,480 | 4/1977 | Baum | 428/601 |
| 4,083,612 | 4/1978 | Olson | |
| 4,146,080 | 3/1979 | Baum | 164/97 |
| 4,169,637 | 10/1979 | Voitas | |
| 4,199,201 | 4/1980 | Trzeciak | |
| 4,366,994 | 1/1983 | Yoshioka | 384/255 |
| 4,410,054 | 10/1983 | Nagel et al. | 384/95 |
| 4,546,836 | 10/1985 | Dennis et al. | 175/107 |
| 4,560,014 | 12/1985 | Geczy | 384/285 |
| 4,620,601 | 11/1986 | Nagel | 175/107 |

FOREIGN PATENT DOCUMENTS

| | | |
|---|---|---|
| 770060 | 3/1957 | United Kingdom . |
| 805638 | 12/1958 | United Kingdom . |
| 2054064 | 4/1973 | United Kingdom . |

*Primary Examiner*—Lenard A. Footland
*Attorney, Agent, or Firm*—Price, Gess & Ubell

[57] ABSTRACT

A unitary sleeve mounts both thrust and radial bearings, the radial bearing being fabricated in a recessed area on an elongated extension and the thrust bearing being mounted in a thrust head at one end of the extension.

3 Claims, 4 Drawing Figures

BEARING ASSEMBLY

The subject invention pertains to bearings and more particularly to an improved bearing structure for supporting the drive shaft of a downhole well drilling motor.

The design of bearing assemblies which will withstand the hostile environments and force loads typically encountered in down hole well drilling presents a continuing challenge to the industry. The extremely high temperatures encountered preclude the successful application of sealed bearing technology as it currently exists. Thus, the prior art has turned to bearing structures exposed to the drilling fluids passing through the downhole motor.

In the prior art, two separate bearings have typically been provided to accomodate the forces on the drive shaft of the downhole motor. The bearings have been designed such that one bearing accomodates radial forces only and the second, separate bearing accomodates thrust loads only. Typical bearing materials have included poly-crystalline diamonds, ceramics, and tungsten carbide matrix.

The separate bearing structures of the prior art have required two separate locking systems for attaching the bearings to the drive shaft. Under operating conditions, the mechanical connections have worn down and shortened the bearings' useful life. Accordingly, it has appeared desirable to the inventor to provide an improved bearing which requires fewer parts and lower machining and servicing costs.

SUMMARY OF THE INVENTION

It is therefore an object of the invention to provide an improved bearing assembly.

It is another object of the invention to eliminate mechanical connections between separate radial and thrust bearing assemblies as employed in the prior art.

It is yet another object of the invention to reduce manufacturing and servicing costs of tools employing such bearings.

According to the invention, the drawbacks of the prior art are eliminated by an extended bearing sleeve which provides a bearing body for both thrust and radial bearings. The bearing sleeve locks to a rotatable drive shaft. Fixed thrust and radial bearings are appropriately located within the shaft housing to cooperate with the bearing elements mounted in the extended sleeve.

According to the preferred approach, the radial bearing surface is first applied to the extended sleeve in a recessed area thereof. Prior to finish machining, diamond thrust bearings are inserted into an appropriate receptacle in the bearing sleeve and brazed into place.

DETAILED DESCRIPTION THE PREFERRED EMBODIMENT

Figure 1:
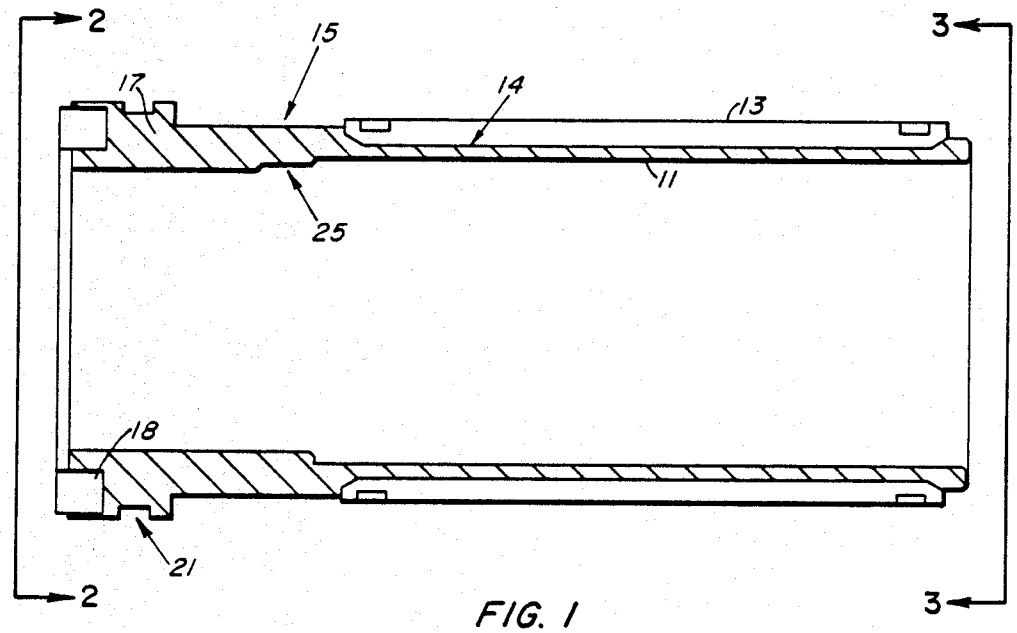
FIG. 1 is a crossection of a bearing sleeve according to the preferred embodiment.

As shown in FIG. 1, the preferred embodiment includes a cylindrical steel bearing sleeve 11 which mounts a radial bearing surface 13 in a recessed area 14. The radial bearing surface 13 typically employs tungsten carbide inserts or a tungsten carbide chip matrix affixed to the steel sleeve 11.

Figure 2:
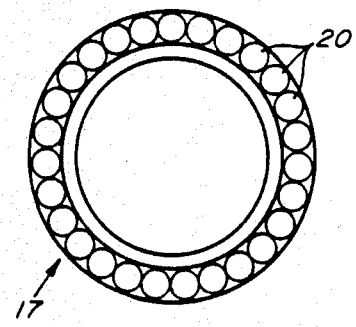
FIG. 2 is a view taken at AA of FIG. 1.
Figure 3:
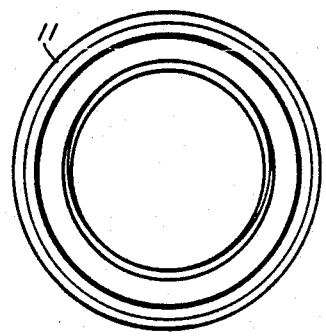
FIG. 3 is a view taken at BB of FIG. 1.

As further illustrated, the steel sleeve 11 includes an extension 15. The extension 15 has a thrust head 17 at its end. The thrust head 17 contains holes 18 for mounting a thrust bearing 19 comprising, for example, diamond thrust bearing inserts 20, such inserts being illustrated in FIG. 2. The outer surface of the thrust head 17 also includes a recessed annular assembling groove 21.

Figure 4:
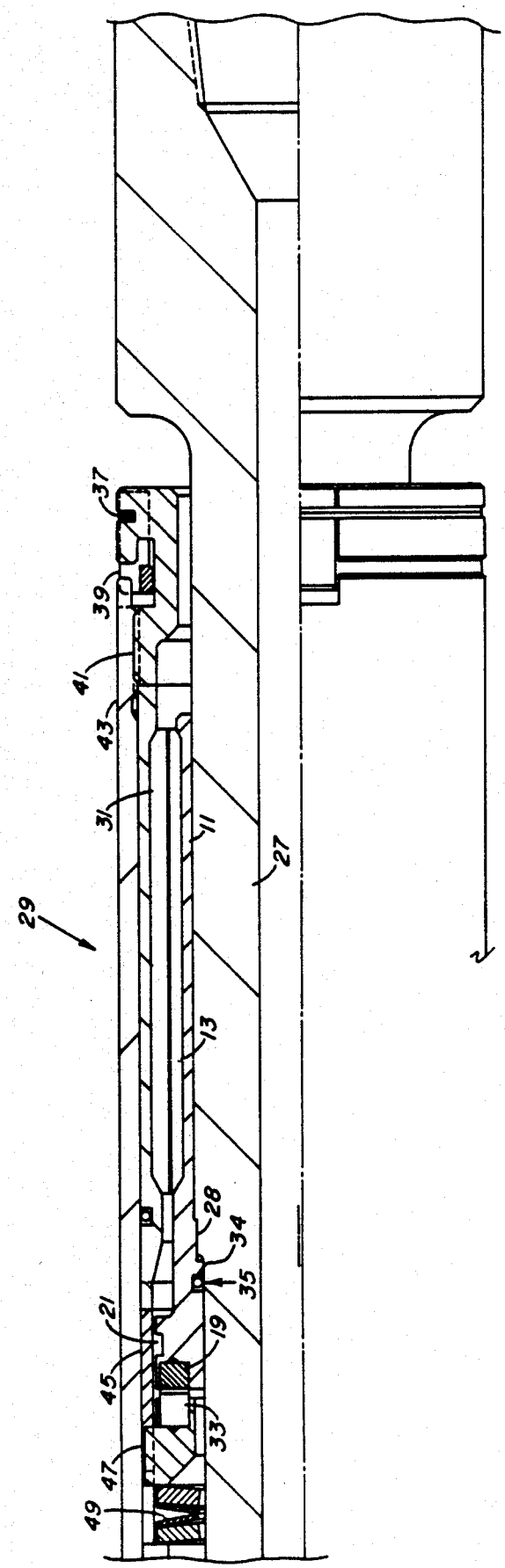
FIG. 4 is a longitudinal section of a drilling tool employing the preferred embodiment.

The steel sleeve extension 15 further includes an eccentric interior ring 25 for locking the sleeve 11 to a drive shaft 27 (FIG. 4). The drive shaft 27 (FIG. 4) also bears an eccentric ring 28. In order to lock the sleeve 11 to the drive shaft 27, the bearing sleeve 11 is placed on the drive shaft 27 and rotated with respect to the drive shaft 27.

FIG. 4 illustrates the bearing sleeve 11 mounted on a drive shaft 27 in the interior of a well drilling tool 29, as typically employed in downhole drilling applications. A stationary radial bearing surface 31 and stationary thrust bearing 33 are provided to cooperate with radial bearing surface 13 and the thrust bearing 19 mounted in the bearing sleeve 11. The annular groove 21 on the bearing sleeve 11 interacts with a pulling tool to remove the bearing sleeve 11 from the drive shaft 27. A groove 34 is also shown for accomodating a sealing o-ring 35.

The drilling tool 29 further includes a lock ring 37, key 39 and bottom lock nut 41 and outer housing 41. Also shown are a spacer sleeve 45, lock 47 and spring 49.

In manufacture, the radial bearing surface 13 is applied to the steel sleeve 11 before insertion of the thrust bearing elements 20, because a higher temperature is required in the process of applying the radial bearing surface than is required to braze the diamond thrust bearing elements into place.

As observed earlier, radial bearing surface 13 is preferably a tungsten carbide bearing structure. In the prior art, bearing surfaces employing tungsten carbide have been manufactured by molding tungsten carbide buttons to a steel radial bearing sleeve utilizing a fine tungsten carbide powder and copper base infiltrant. The buttons are affixed to the surface of the carbon mold in a predetermined pattern which, depending upon size, may utilize as many as 299 buttons. Once molded into place, the buttons and surrounding matrix must be machine finished. An improved and less expensive bearing surface employing available tungsten carbide chip material has been disclosed in U.S. Ser. No. 795,218 filed Nov. 5, 1985 and assigned to Smith International, Inc.

In accordance with that invention, a chip matrix is created from a mixture of e.g. 60 percent by weight of 80 mesh and down macro-crystalline tungsten carbide powder and 40 percent by weight of TCM 10/18 mesh cemented tungsten carbide cobalt chips. The blend is such that the mixture of powders may be loaded in a cavity surrounding a steel blank and infiltrated with a copper base infiltrant and cooled to provide a bearing surface ready for finishing. The resultant chip matrix may be molded closer to final size, therefore requiring less time to finish compared to the prior art button structure. An additional advantage is that the percentage of tungsten carbide bearing surface area is increased over the molded button approach.

The diamond inserts 20 may comprise diamond faced studs inserted directly into wells in the thrust head 17.

Alternatively diamond faced tungsten carbide inserts may be press-fitted into through-holes in an annular steel ring to form a subassembly. The subassembly may then be placed over a complementary brazing ring and subjected to induction heating to braze the inserts and ring together and to the thrust head end 17.

Regardless of the particular bearing surface technology employed, the bearing structure of the preferred embodiment provides a unitary mounting for both radial and thrust bearing elements. The sleeve is adapted to positively lock to the drive shaft and to be readily removable therefrom. The structure provides for relatively easy and inexpensive manufacture, operation and servicing.

Those skilled in the art will appreciate that many modifications and adaptations of the disclosed bearing structure may be derived without departing from the scope and spirit of the invention. Therefore, it is to be understood that, within the scope of the appended claims, the invention may be practiced other than as specifically described herein.

What is claimed is:

1. In a downhole earth boring motor, apparatus comprising:
   a drive shaft;
   a generally cylindrical unitary bearing sleeve having an elongated recessed area on its outer surface and an integrally formed thrust head at one end thereof;
   a radial bearing comprising tungsten carbide chips in a copper base infiltrant bonded to said sleeve in said elongated recesssed area;
   a plurality of radially disposed cylindrical openings in said thrust head for mounting thrust bearing elements;
   a plurality of cylindrical diamond faced thrust bearing elements, one mounted in each of said openings;
   an eccentric interior locking ring means on said unitary sleeve; and
   means on said drive shaft cooperating with said interior locking ring means for locking said unitary bearing sleeve to said drive shaft.

2. The bearing assembly of claim 1 wherein said diamond faced thrust bearing inserts comprise polycrystalline diamond faced inserts.

3. The bearing assembly of claim 2 further including an annular groove on said thrust head.

* * * * *

UNITED STATES PATENT AND TRADEMARK OFFICE
CERTIFICATE OF CORRECTION

PATENT NO. : 4,710,036
DATED : December 1, 1987
INVENTOR(S) : Bela Geczy

It is certified that error appears in the above-identified patent and that said Letters Patent is hereby corrected as shown below:

Column 1, line 18, "accomodate" should read -- accommodate --.

Column 1, line 20, "accomodates" should read -- accommodates --.

Column 1, line 58, "crossection" should read -- cross section --.

Column 1, line 65, before "THE" insert -- OF --

Column 2, line 28, "accomodating" should read -- accommodating --.

Signed and Sealed this

Tenth Day of May, 1988

Attest:

DONALD J. QUIGG

*Attesting Officer*  *Commissioner of Patents and Trademarks*